G. S. ANDRUS.
VULCANIZER.
APPLICATION FILED JULY 3, 1919.

1,339,151.

Patented May 4, 1920.
2 SHEETS—SHEET 1.

Inventor,
George S Andrus
By Bates & Macklin
Attys.

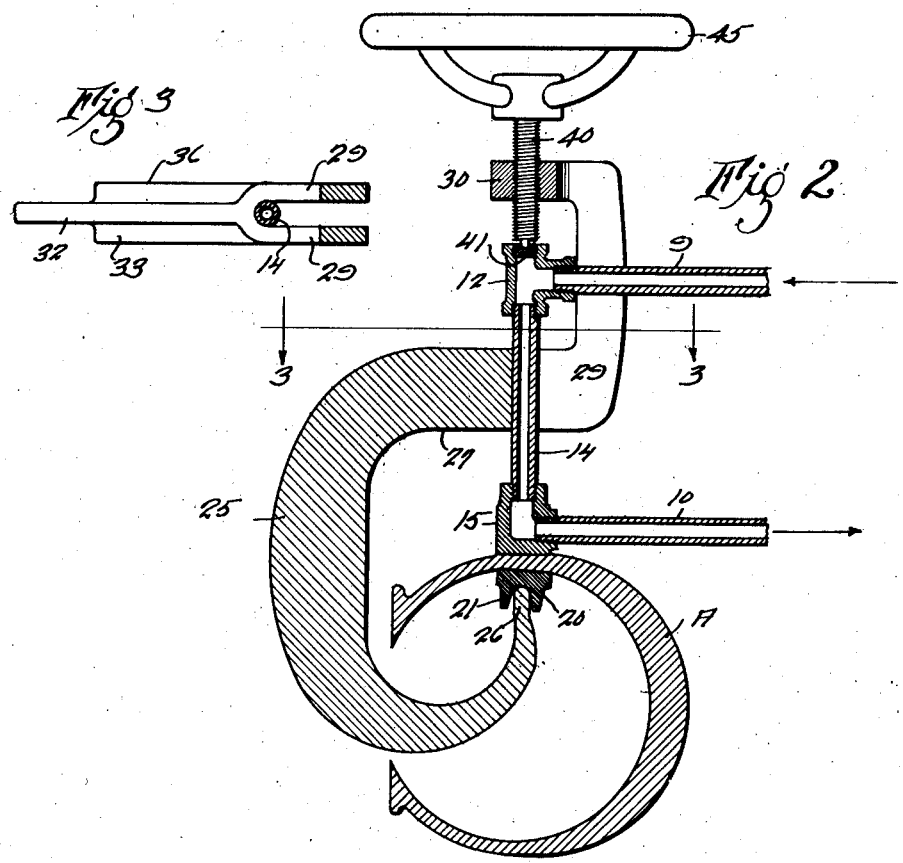
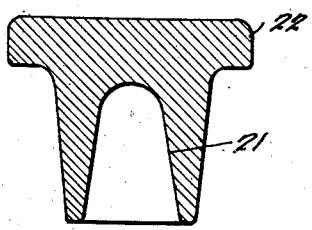
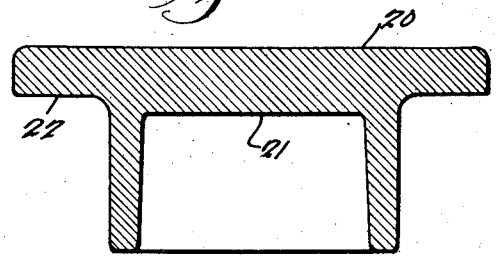

UNITED STATES PATENT OFFICE.

GEORGE S. ANDRUS, OF AKRON, OHIO.

VULCANIZER.

1,339,151.   Specification of Letters Patent.   Patented May 4, 1920.

Application filed July 3, 1919. Serial No. 308,637.

*To all whom it may concern:*

Be it known that I, GEORGE S. ANDRUS, a citizen of the United States, residing at Akron, in the county of Summit and State of Ohio, have invented a certain new and useful Improvement in Vulcanizers, of which the following is a full, clear, and exact description, reference being had to the accompanying drawings.

The object of this invention is to provide an effective device for use in vulcanizing rubber articles such as automobile tire casings or tubes. The invention is particularly adapted for use in repairing such articles, and another object is to arrange the device that it may occupy a minimum amount of room, and be easily applied and adjusted to the article to be repaired.

In carrying out my invention I may provide steam supply and exhaust pipes connected to header lines or pipes preferably mounted along the wall a few feet above the floor. Another object is to arrange to support the vulcanizing device itself by such pipes while the desired pressure upon the rubber is secured by squeezing the rubber between an anvil and a heating element heated by the steam. These two elements are urged together by a pressure device and frame in a unique manner to bring these parts together as will appear in the following description. The invention lends itself readily to the alternative use of steam or electric heat, the pipe fittings being used in the latter case merely as a support.

The above and other objects will become more apparent in the following description which relates to the drawings illustrating a preferred embodiment of my invention. The essential characteristics hereof are summarized in the claims.

Figure 1:
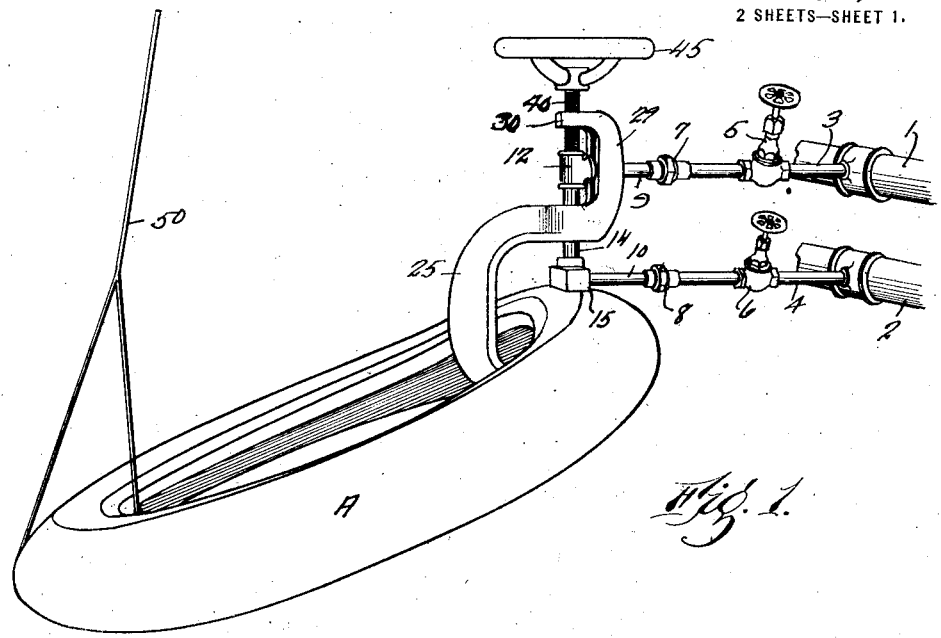
Figure 6:
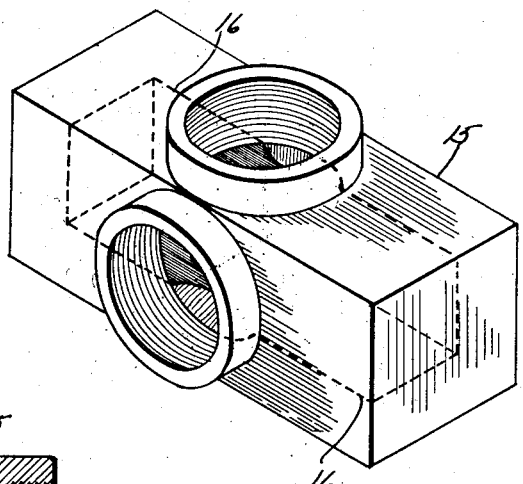
Figure 7:
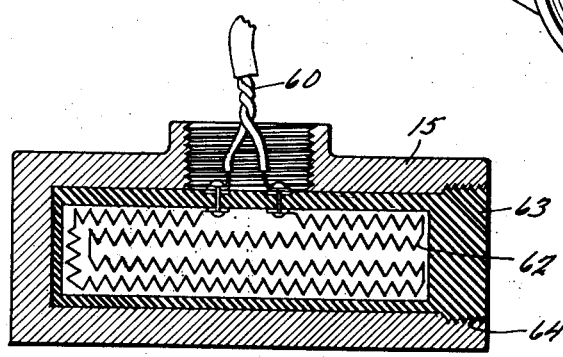

In the drawings Figure 1 is a perspective view of my vulcanizing device showing a tire casing in position to have a portion thereof vulcanized by the use of this device. Fig. 2 is a vertical section through the vulcanizing device itself and through the tire. Fig. 3 is a sectional detail taken substantially on the line 3—3 of Fig. 2. Fig. 4 is a transverse section on a large scale of the anvil member coöperating with the heating member. Fig. 5 is a longitudinal section of same. Fig. 6 is a perspective view of the heating member removed. Fig. 7 is a longitudinal section of the heating member shown as a slightly modified form arranged to accommodate an electric heating element.

Describing the invention by the use of characters, 1 and 2 indicate steam header lines preferably arranged along the wall of the room a few feet above the floor, the one carrying live steam and the other forming the exhaust passage. Connected with these lines 1 and 2 are pipes 3 and 4 leading through suitable valves 5 and 6 and each provided with standard coupling fittings 7 and 8 respectively. The comparatively short lengths of pipes 9 and 10 projecting from the couplings 7 and 8 are shown as threaded to a T member 12 and a header member 15 respectively, and these members are connected by a pipe 14 as shown. This completes a circuit for a heating fluid such as steam passing through the pipe 1, through the connections described to the pipe 2.

The member to be vulcanized, illustrated in the drawings as a tire casing A, is held against the heating member 15 by an anvil member 20, which is removably supported by an S-shaped (inverted) frame 25. This frame has an upwardly projecting portion 26 fitting a cavity 21 on the under side of the anvil member 20, and the frame extends downwardly from the anvil outwardly and upwardly and then transversely at 27 past the pipe 14, this transverse portion 27 being bifurcated to form two arms 29 embracing the pipe 14, and extending upwardly and embracing the pipe 9, being joined again at their upper ends to form a boss 30. The lower portion of the frame is preferably of a braced construction having a wide vertical flange 32, and laterally projecting ribs 33 extend from the divided portion of the arms downwardly and merge with the projection 26.

The boss 30 as shown is threaded to receive a screw 40 having a projection on its lower end seating in a recess in the plug 41 threaded into and closing one of the openings of the T fitting 12. The upper end of this screw carries a suitable handwheel 45 by which the screw may be rotated to exert pressure urging the members 15 and 20 together to squeeze between them the article to be vulcanized. Members 29 closely embrace pipes 9 and 14, thus guiding the frame 25 to cause an alinement of the members 15 and 20, and this is facilitated by reason of the fact that the heavier portion of the frame 25 tends to swing about the point of the screw 40 (to the right in Fig. 2) bringing the shoulder, formed by the joining of the arms 29, against the side of the pipe 14. It will be seen that the frame is effectively guided in all directions, while being capable of swinging about the point of the screw 40 outwardly to the left in Fig. 2, facilitating the removal of the article upon separating the members 15 and 20 pressing thereon, by the turning of the screw 40.

The use of the invention as so far described may be outlined as follows: Assuming, for example, it is desired to repair by vulcanizing a portion of the surface of a tire casing, such as illustrated in the drawings. It is only necessary to lower the frame 25 by rotating the screw 40 sufficiently to insert the tire between the anvil 20 and heating member 15, bringing the spot to be repaired directly between these elements, and then to urge the elements together to obtain the desired pressure by rotating the screw 40 in the opposite direction. The valves 5 and 6 may now be opened to bring the heating fluid, such as live steam, to the member 15, which it will be noted, has a longitudinal chamber 16 (Fig. 6) to secure an even distribution of the heat upon the lower surface of the member 15 presented to the tire.

To prevent distortion of the tire while subjected to this vulcanizing heat, it may be supported in any suitable manner, as for example, a cord 50 extending around the casing opposite the vulcanizing portion may carry the casing at the proper angle. The tire is allowed to remain in this position for any proper length of time to insure completion of the vulcanizing process and is then removed by lowering the anvil 20 by rotating the screw 40 as described.

The curving of the clamping frame, as illustrated, has in addition to the advantage of the guiding effect, a further advantage that such articles as tire casings may be operated upon by the device, while in a position extending away from the wall or other support for the vulcanizing device. The result is a greater capacity for various sizes and shapes of articles while the frame itself is quite close to the support therefor occupying a minimum amount of space when not in use.

A very useful shape of the anvil 20 has been found to be that illustrated in the drawings, in which it is shown as substantially a plate portion 22 from which projects a hollow boss having a cavity 21 flaring transversely as shown in Fig. 4, so that it may rock about the rounded point of the projection 26 of the supporting frame to adjust itself to uneven thicknesses of the articles to be vulcanized. That is, it may rock toward the right or left in Fig. 2 to accommodate itself to the taper of the tire casing as illustrated in this figure. The corners of the plate portion are rounded as shown.

It will be seen that, if desired, the invention may readily employ other means of heating the element 15. For example, in case the invention is to be used where steam is not available, the pipes 9 and 10 could be conveniently secured to the wall or other support in any suitable manner, while wires 60 may be led through one of the pipes to resistance heating wires 62, preferably suitably arranged in a closed hollow member of insulating and refractory material 63 carried in the member 15. This member may be conveniently provided with an open end having threads at 64 to receive threads formed on the insulating member 63. The bosses for receiving the pipes 10 and 14 are naturally arranged in the same manner as for the use of steam, but serve merely as supports for this member 15 and to coöperate with the frame 25 as heretofore described.

Having thus described my invention, what I claim is:

1. In a device of the character described, the combination of a supporting arm and an arm rigid therewith and forming an angle thereto, a clamping member having separate portions embracing said arms and having an extension brought into alinement with one of said arms, means carried by the extension for moving said clamping member, and a heater and anvil adapted to be brought by such means into coaction upon an interposed object to be vulcanized.

2. In a device of the character described, the combination of a supporting arm and an arm rigid therewith and forming an angle thereto, a clamping member having separate parallel portions embracing the said arms and having an extension brought into alinement with one of said arms; and means for causing relative movement between the supporting member and the clamping member.

3. In a vulcanizing device, the combination of a heating element, an upright supporting member therefor, a substantially horizontal supporting member carrying the upright support, an anvil for pressing the article to be vulcanized to the heating element, and a clamping member carrying the anvil comprising separate guide members embracing the supporting members at opposite sides thereof while permitting relative movement, and means for causing such movement.

4. In a vulcanizing device, the combination of a substantially horizontal arm, an upright arm rigid therewith, a heating element on the upright arm, a clamping member for urging the material to be vulcanized to the heating element, said clamping member including separate parallel portions slidably embracing the arms and extending over the top of the upright arm, and means for moving said clamping member relatively to the support.

5. In a vulcanizing device, the combination of a substantially horizontal arm, an upright arm rigid therewith, a heating element on the upright arm, a clamping member for urging the material to be vulcanized to the heating element, said clamping member including separated parallel portions slidably embracing the sides of the arms and extending over the top of the upright arm, and a screw through such extension acting against the upright arm.

6. In a vulcanizing device, the combination of a pair of parallel substantially horizontal members, an upright member connecting them, a heating element carried by these members, a clamping member having parallel sections embracing the upright member and one of the horizontal members in a manner to allow sliding movement, and means for moving the clamping member.

7. In a device of the character described, the combination of substantially horizontal pipes rigidly mounted, an upright pipe connecting same whereby heating fluid may circulate there through, a heating element carried by one of said pipes and having a surface adapted to bear against the article to be vulcanized, means for clamping the article against the surface comprising a member curving outwardly away from the upright member and then upwardly and having separated portions embracing the upright pipe and one of the horizontal pipes, and means for causing relative movement of the clamping member and said pipes.

8. In a vulcanizing device, the combination of a pair of parallel supporting pipes, a heating element carried thereby, means for heating said element, an upright member connecting said pipes, an S-shaped member having a portion overhanging the upright member, a screw extending therethrough and engaging the upper end of the upright member, said S-shaped member having a bifurcated portion slidably embracing one of the horizontal members and the upright member and extending beneath said heating element, and a head loosely mounted on the latter extension.

9. In a device of the character described, the combination of a pair of substantially parallel pipes, an upright pipe connecting the same, a hollow heating element at the joint between the upright pipe and one of said parallel pipes, a clamping member adapted to press the material against said heating element comprising an S-shaped arm extending downwardly from the heating element and having a bifurcated portion embracing the upright pipe and then extending upwardly and embracing one of the other pipes and then extending over the upright member, a screw extending through the latter extension and bearing on the upright member and causing relative movement of the clamping member and pipes.

10. In a vulcanizing device, the combination of a pair of pipes for heating fluid, an upright pipe connecting the same, a hollow member forming the connection between the upright pipe and one of the pair of pipes and having a surface adapted to engage the article to be vulcanized, a head adapted to be urged against the article to press it toward the heating element, an S-shaped arm carrying said head and having a bifurcated portion slidably embracing the upright pipe and one of the horizontal pipes, and means for moving the clamping member as desired.

11. A vulcanizing device comprising a narrow supporting frame, a heating element carried by such frame, a clamping member slidably and non-rotatably embracing said frame, and means for urging a portion of said clamping member against said heating element.

12. A vulcanizing device comprising a tubular frame, a heating element constituting a portion of said frame, a clamping member slidably and non-rotatably mounted on said frame, and screw threaded means for urging a portion of said clamping member against said heating element.

13. A vulcanizing device comprising an angular tubular frame, a heating element carried by said frame, means for supplying heat to said element through said frame, a clamping member slidably and non-rotatably supported by said frame, an anvil carried by said clamping member, and means for urging said anvil against said heating element.

14. A vulcanizing device comprising an angular tubular frame connected to supply and exhaust steam pipes, a heating element constituting a portion of said frame, a clamping member slidably and non-rotatably supported by said frame, and a screw engaging said frame and clamping member for urging a portion of said clamping member against said heating element.

In testimony whereof I hereunto affix my signature.

GEO. S. ANDRUS.